United States Patent [19]

Fujii et al.

[11] Patent Number: 5,720,806
[45] Date of Patent: Feb. 24, 1998

[54] FILLER FOR INK JET RECORDING PAPER

[75] Inventors: Tsuneo Fujii, Yamaguchi-ken; Hiroshi Tonoike, Kudamatsu; Daisaku Isomura, Tokuyama, all of Japan

[73] Assignee: Tokuyama Corporation, Yamaguchi-ken, Japan

[21] Appl. No.: 722,830

[22] Filed: Sep. 27, 1996

[30] Foreign Application Priority Data

Sep. 29, 1995 [JP] Japan ................................. 7-253721

[51] Int. Cl.$^6$ ....................................................... C08K 5/00
[52] U.S. Cl. ............................ 106/483; 106/481; 106/482; 106/484; 162/162; 162/181.4; 162/181.6; 423/330.1; 423/335; 423/339
[58] Field of Search ........................ 106/483, 484, 106/481, 482; 423/339, 335, 330.1; 162/162, 181.6, 181.4

[56] References Cited

U.S. PATENT DOCUMENTS

| | | | |
|---|---|---|---|
| 2,699,376 | 1/1955 | Hay | 423/335 |
| 3,669,624 | 6/1972 | Warthen et al. | 423/335 |
| 3,794,712 | 2/1974 | Aboutboul et al. | 423/339 |
| 3,794,713 | 2/1974 | Aboutboul et al. | 423/339 |
| 4,012,452 | 3/1977 | Frampton | 423/335 |
| 4,312,845 | 1/1982 | Wason | 106/482 |
| 4,629,588 | 12/1986 | Welsh et al. | 423/339 |
| 4,892,591 | 1/1990 | Ogawa et al. | 106/482 |
| 5,647,903 | 7/1997 | McGill et al. | 106/482 |

FOREIGN PATENT DOCUMENTS

| | | |
|---|---|---|
| 0218956 | 4/1987 | European Pat. Off. . |
| 0298424 | 1/1989 | European Pat. Off. . |

OTHER PUBLICATIONS

Patent Abstracts of Japan, vol. 9, No. 107 (M-378) [1830], May 11, 1985 & JP-A-59 230787 (Mitsubishi Seishi K.K.), Dec. 25, 1984, *abstract*.

Patent Abstracts of Japan, vol. 13, No. 398 (M-866) [3746], Sep. 5, 1989 & JP-A-01 141783 (Honshu Paper Company Limited), Jun. 2, 1989, *abstract*.

*Primary Examiner*—Mark L. Bell
*Assistant Examiner*—Scott L. Hertzog
*Attorney, Agent, or Firm*—Wenderoth, Lind & Ponack

[57] ABSTRACT

The invention provides a filler for ink jet recording paper which is composed of an amorphous silica containing 0.3–1.0% by weight of $Al_2O_3$ and having a BET specific surface area of 250–400 $m^2/g$, a mean particle size of 3.6–10.0 μm and a peak position of pore radius as measured by mercury injection method of 37.5–75 angstrom. A coat layer of ink jet recording paper formed of this filler excels not only in true circle property of dots and ink absorbing property when printed by ink jet recording system, but also in surface strength and writing quality. Furthermore, the coating liquid containing this filler has a low viscosity and hence exhibits good coating workability.

13 Claims, No Drawings

FILLER FOR INK JET RECORDING PAPER

This invention relates to a novel filler for ink jet recording paper (which may be hereafter referred to simply as "filler") which is useful for forming a coat layer of ink jet recording paper. More particularly, the invention relates to a filler for ink jet recording paper composed of amorphous silica powder having a specific $Al_2O_3$ content, BET specific surface area, mean particle size and pore radius. A coat layer on ink jet recording paper, which is composed of a filler of the invention excels not only in true circle property of the ink dots printed by ink jet recording system and ink absorbing property, but also in surface strength as well as writing quality. The coat liquid containing the filler has low viscosity and therefore affords ready coating operation thereof on ink jet recording paper.

Printing by ink jet recording system has been adopted for various printers in these years, for the reason that it allows easy conversion to color printing, and is rapidly acquiring high popularity.

A recording paper to be used for printing by the ink jet recording system is required to have the properties that the ink drops applied to its surface coat layer should be quickly absorbed into the paper and should stay within the vicinity closest possible to the paper surface. The recording paper satisfying such requirements can (1) maintain true circle property of the ink dots,
(2) prevent spreading of ink dots and
(3) increase optical density of printed letters or images, and, therefore, gives clear printed letters or images of high optical density. Furthermore, in addition to the above properties, the recording paper must meet the important requirement that said coat layer should have high surface strength and writing quality.

As a method for imparting such desirable properties to an ink jet recording paper, it is known to apply onto base paper an aqueous dispersion formed by mixing a filler having liquid absorbing property, a binder and water, and drying the same to form a coat layer. For example, Japanese Patent Publication No. 71394/1993 has proposed the use of amorphous silica of relatively small particle size, i.e., a mean particle size within a range of 2.5–3.5 μm, in which at least 20% of the total pores have a size within a range of 60–130 angstrom (as measured by nitrogen adsorption method) and which shows an oil absorption of at least 250 ml/100 g, as the filler for ink jet recording paper.

Generally, however, it is not sufficient for a filler for ink jet recording paper to have good liquid absorbing property alone, but it must also meet such other requirements that it should allow easy preparation of aqueous dispersion thereof, absorb ink quickly and stops the ink in the vicinity of the paper surface. The filler must also exhibit high surface strength and good writing quality.

For example, a filler having good liquid absorbing property quickly absorbs ink into the coat layer as the ink is dropped onto the coated surface, to effectively prevent smudging or blurring of the ink dots, but occasionally has a problem in optical density of printed letters.

Again a filler having a low liquid absorbing rate, even though its liquid absorbing property itself is adequate, may allow the ink which is dropped onto the coated surface to flow on said surface or thereabout, causing smudges or blurs.

Moreover, in the process of preparing ink jet recording paper, a dispersion of a filler in an aqueous binder solution is to be coated on base paper. In that occasion, viscosity of the aqueous dispersion is an important factor to determine coating workability. That is, when the aqueous dispersion has a high viscosity, its coating operation becomes difficult and streaks or the like may occur. In an extreme case, the coating itself may become inoperable. For avoiding such a drawback, for example, it can be proposed to reduce the filler concentration in said dispersion. However, the coat layer resulting from application of a dispersion of low filler concentration no more exhibits the performance of satisfactory ink jet recording paper.

The invention of Japanese Patent Publication No. 71394/1995 is very significant in that it provides for good true circle property of ink dots, but it renders viscosity of the aqueous dispersion too high. Hence the filler concentration in the coating liquid cannot be raised to a sufficient level and coating workability is unsatisfactory. The invention is open to further improvement in respect of also such properties as optical density of printed letters on the coat layer, writing quality and surface strength of the resultant ink jet recording paper, etc.

An object of the present invention is to provide a filler for forming a coat layer of ink jet recording paper, which enables formation of a coat layer capable of maintaining true circle property of ink dots while preventing spreading of ink dots, and of increasing optical density of printed letters.

Another object of the present invention is to provide a filler for ink jet recording paper, which can give the aqueous dispersion having a low viscosity and convenient coating workability.

A still further object of the present invention is to provide a filler which suits for the preparation of ink jet recording paper having a coat layer which exhibits good writing quality and favorable surface strength.

I have engaged in concentrative studies with the view to solve the above-described problems in the conventional technology and discovered that amorphous silica having relatively small pore radii and relatively large particle sizes can provide aqueous dispersions of low viscosity allowing easy coating operation; and that the ink jet recording paper having a coat layer formed of said aqueous dispersion exhibits good writing quality. Based on these discoveries, we have completed the present invention.

Thus, according to the present invention, a filler for ink jet recording paper is provided, which is composed of amorphous silica containing 0.3–1.0% by weight of aluminum oxide ($Al_2O_3$) and having a BET specific surface area of 250–400 $m^2/g$, a mean particle size within a range of 3.6–10.0 μm and the peak position of pore radius as measured by mercury injection method within a range of 37.5–75 angstrom.

According to the present invention, the amorphous silica powder is required to have a BET specific surface area within a range of 250–400 $m^2/g$, preferably 2.70–360 $m^2/g$. When the BET specific surface area is less than the above lower limit, the formed coat layer exhibits reduced ink absorbing ability and can no more maintain true circle property of ink dots. The coat layer furthermore comes to have a reduced surface strength, probably for the loll owing reason: while the base paper-coat layer binding and silica-to-silica binding in the amorphous silica powder forming the coat layer are effected via a binder which is added to the coat layer, the binder mainly binds to hydroxyl groups at the surfaces of amorphous silica powder and, hence, it is presumed that the greater the specific surface area, the higher the surface strength. On the other hand, when the BET specific surface area is more than the above upper limit, the aqueous dispersion (coating liquid) to form the coat layer has too high a viscosity which provides only poor coating workability. It is thus desirable to select an appropriate specific surface area from the above-specified range, so as to secure a good balance between the viscosity of the aqueous dispersion serving as the coating liquid and the surface strength of the coat layer.

The amorphous silica powder according to the present invention is required to contain 0.3–1.0% by weight of aluminum oxide ($Al_2O_3$). The $Al_2O_3$ content affects the later-described peak position of pore radius and eventually, viscosity of the aqueous dispersion. That is, when the $Al_2O_3$ content is less than 0.3% by weight, or exceeds 1.0% by weight, in both cases the peak position of the pore radius cannot be adjusted to a value within the range of 37.5–75 angstrom, and hence viscosity of the aqueous dispersion cannot be maintained at a suitable low level. In order to adjust the peak position of pore radius to an adequate range and to reduce viscosity of the aqueous dispersion, the $Al_2O_3$ content preferably ranges form 0.5 to 0.8% by weight.

According to the present invention, the amorphous silica powder is required to have the peak of pore radius within a range of from 37.5 to 75 angstrom. In consequence of a large number of experiments I conducted about properties of amorphous silica powder, I found that characteristics of a coat layer formed of a certain filler are not determined simply by BET specific surface area and water absorption, but are significantly affected by the peak position of pore radius which is desirably within a range of 37.5–75 angstrom. I have also found that the peak position of the pore radius significantly affects viscosity of the aqueous dispersions of amorphous silica powder. When the peak of pore radius is present at a level less than the above-specified range, ink absorbing rate of the resulting coat layer is reduced. Whereas, when the peak is present at a position greater than the above-specified range, smudging of ink, reduction in optical density of printed letters and rise in viscosity of aqueous dispersions are invited. The pore radius peak preferably ranges from 40 to 65 angstrom, inter alia, from 42 to 56 angstrom.

Japanese Patent Publication No. 71394/1993, which is earlier referred to, discloses that the amorphous silica used therein has the peak of pore size distribution within a range of 60–130 angstrom, when the pore sizes are measured by nitrogen adsorption method. That the specified range of 60–130 angstrom referred to herein is that of pore radius is clear from the direction of use of the device used for the pore size measurement, i.e., a pore size distribution meter by means of nitrogen adsorption, SORPTOMATIC (commercial device manufactured by CARLO ERBA Instruments).

In the present invention, it is also important that the amorphous silica powder should have a mean particle size within the range of 3.6–10.0 µm. When the mean particle size is less than 3.6 µm, viscosity of the coating liquid (the dispersion formed of a filler of the present invention as dispersed in aqueous binder solution) rises to render it difficult to sufficiently raise the filler concentration in the coating liquid. Also the writing quality and surface strength of the ink jet recording paper are impaired. On the other hand, when the mean particle size is greater than 10.0 µm, the coat layer surface becomes uneven because of the amorphous silica powder. Thus the hand of the paper surface is deteriorated and true circle property of ink dots is impaired. The mean particle size of amorphous silica preferably ranges from 4.0 to 9.0 µm, inter alia, from 5.5 to 8.0 µm.

In the present invention, it is satisfactory that the mean particle size of the amorphous silica be within the specified range, but it is still preferred that the particle size distribution of the silica be such that the equal number n of Rosin-Rammler's distribution is within a range of 0.8–2.5. Such specific particle size distribution works synergistically with other parameters characteristic of the amorphous silica of the present invention, i.e., the specific BET specific surface area and/or the specific peak position of pore radius, to markedly improve optical density of printed letters. A small value of said equal number n signifies a broad particle size distribution.

The equal number n in Rosin-Rammler's distribution can be easily determined by a method comprising dispersing a sample amorphous silica powder in an aqueous methanol solution; measuring each integrated weight R of the particles having a particle size δ within a particle size range of from 0.6 to 20 µm using Coulter Counter (aperture size=50 µm or 200 µm); plotting the result on a Rosin-Rammler's diagram to obtain a straight line; translating said straight line until it passes through the pole point, and reading the equal number n on its extension line.

In the present invention, the amorphous silica powder to be used as the filler for ink jet recording paper is subject to no special limitation as to shape, properties, etc., other than those already specified. Whereas, for example, its oil absorption is preferably at least 250 ml/100 g.

According to the present invention, the method of preparing the amorphous silica powder is not critical, while generally those using sodium silicate as the starting material are recommendable. A typical example of such methods is as follows.

A sodium silicate solution containing an aluminum compound which is convertible to $Al_2O_3$ in an amount of 0.2–0.7% by weight (as $Al_2O_3$) and a sodium compound which is convertible to $Na_2O$ in an amount of 0.46–0.48% by weight (as $Na_2O$) (said percentages are based on the sum of $Al_2O_3$ and $SiO_2$ in the sodium silicate), in which $SiO_2$/$Na_2O$ molar ratio=2.95–3.10 and $SiO_2$ content=4.8–5.2% by weight, is maintained at 38°–42° C., during which sulfuric acid is added thereto to a neutralization ratio of 48–52%. Then temperature of the solution is raised to 90°–95°, and into the solution sulfuric acid is added at a constant rate, until the system comes to have a pH of 3–3.5 under stirring. Thus obtained precipitated silica is filtered, washed with water, dried and ground by any known means to the prescribed particle size. If necessary, the powder is subjected to classification.

In practicing the above method, BET specific surface area of the powder is adjustable by controlling mainly the reaction temperature, $SiO_2$ concentration, neutralization ratio and duration of sulfuric acid addition. The pore size distribution is adjustable by controlling the aluminum compound concentration, the sodium compound concentration, reaction temperature, $SiO_2$ concentration and neutralization ratio.

In the above method any aluminum compound can be used, so long as it is convertible to $Al_2O_3$ during the reaction, while normally aluminum sulfate, aluminum hydroxide or the like are used. As the sodium silicate solution containing such an aluminum compound, for example, a solution obtained through the steps of together heating and dissolving sodium silicate cullet, an aluminum compound and water, cooling the resulting solution and filtering the same, is conveniently used. The $Al_2O_3$ content of the resulting amorphous silica powder can be adjusted by controlling the $Al_2O_3$ concentration in the sodium silicate solution which is used for the reaction.

In the above method, furthermore, the sodium compound may be any that can be converted to $Na_2O$ upon the reaction, while normally sodium sulfate and the like are used.

The drying is preferably conducted with a spray dryer, as it increases oil absorbing property of the powder. The grinding is preferably conducted with a grinder which does not use a grinding medium, such as a jet mill, in order to prevent admixture of impurities.

The ink jet recording paper as intended in the present invention can be provided by applying an aqueous dispersion (coating liquid) containing a filler of the present invention and a binder onto a base material, by a method itself known. As the binder, generally a known water-soluble high molecular binder such as polyvinyl alcohol, starches, water-soluble cellulose derivatives, water-soluble proteins, etc. are used. While concentration of the filler in the coating liquid is subject to no critical limitation, it is normally selected, for example, from within a range of 10–30% by weight. In particular, a filler according to the present invention can be used at a high concentration within the above range.

Furthermore, normally preferred weight ratio of the filler to a water-soluble high molecular binder ranges from about 0.5 to about 10. The coat layer formed on a base paper with a coating liquid as above-described is preferably applied at such a ratio that the layer contains 2–15 g/m$^2$ of the amorphous silica powder as the filler, whereby the effect of the filler of the present invention can be fully exhibited.

As can be understood from the foregoing explanation, ink jet recording paper exhibiting good ink absorbing property and high absorption rate and excelling in writing quality and surface strength can be obtained according to the present invention. The filler for ink jet recording paper of the present invention is particularly advantageous in that it can form a coating liquid of low viscosity. For example, an aqueous dispersion obtained upon dispersing the filler in pure water normally exhibits a viscosity not higher than 200 cps, preferably that of 20–150 ops, inter alia, 20–100 cps, as measured by the method described later. Such low viscosity levels of the dispersions in pure water signifies that a coating liquid formed upon dispersing a filler of the present invention in an aqueous solution containing any desired binder also has a low viscosity. Thus, the present invention can drastically improve the coating workability in the process of preparing ink jet recording paper.

Hereinafter Examples are presented with the view to explain the present invention stilt more concretely, it being understood that the present invention is in no way restricted by the following Examples. The various tests in the Examples and Comparative Examples were carried out by the following methods.

(1) Measurement of specific surface area: measured with a simple type BET specific surface area meter utilizing $N_2$ adsorption.

(2) Pore size distribution: measured with CARLO ERBA Instruments' pore size distribution meter, Porosimeter-2000 model employing mercury injection method.

(3) Measurement of mean particle size:

A minor amount of a sample powder was added to methanol and dispersed for 3 minutes with an ultrasonic dispersion instrument. The mean particle size of the resulting dispersion was measured with Coulter counter system particle size distribution meter (Coulter Electronics INS., TA-11 Model ), using an aperture of 50 µm or 200 µm.

(4) Oil absorption: measured following JIS K5101.

(5) Viscosity of dispersion in pure water: 125 grams of a sample was added into 375 g of pure water, stirred for 30 minutes at 4000 rpm using Homodisper (Tokushukika Kogyo K. K., Model SL), and viscosity of the formed dispersion was measured with B model viscometer.

(6) Printed image evaluation:

Using Espon Co.'s MJ-5000C Printer, letters were printed on a recording paper each prepared by the later described method. The printed images were evaluated as to the following items:

a. dot shape (true circle property)

The dots forming the printed images were observed as enlarged by a magnifying lens, and when 95% or more of the dots had shapes close to true circle, true circle property of the paper was ranked A; when from 70% to less than 95% of the dots had shapes close to true circle, ranked B; and when they are less than 70%, ranked C.

b. Ink absorbing property

An ink (Dainippon Paint, Co., BX-204) 0.05 cc was dropped on the tested paper surface with a microsyringe from a height of 1 cm, and the time required for complete absorption of the ink into the paper was measured.

c. Optical density of printed letters

Optical density of the images of printed letters was evaluated with naked eye, following the standard of rating as below:

⊙ ... density of printed letters considerably high and the images considerably clear;

○ ... density of printed letters high and the images clear;

△ ... density of printed letters low and the images unclear.

d. Surface strength

The coat layer of a tested paper was divided into 50 lots by six vertical and 11 horizontal linear incisions entered at an interval of 5 mm. A celophan tape was adhered to the coat layer surface covering the whole lots and peeled off. The number of the lots from which the coat layer was peeled in that occasion was counted.

e. Writing quality

A recording paper coated with amorphous silica powder, "X-37" (commercial product of Tokuyama Corp.) was used as the standard, and the ink jet recording papers which exhibited better writing quality than that of the standard were evaluated ⊙; those of equivalent writing quality, ○; and those of inferior writing quality, △.

(7) Preparation of recording paper:

To 1000 ml of a 20% aqueous solution of polyvinyl alcohol (Kuraray Kabushiki Kaisha: PVA Kuraray R1130), 250 g of an amorphous silica powder and 150 g of sodium polyacrylate as a dispersant were added and thoroughly dispersed with a Homodisper. The resulting dispersion was coated on a high quality paper weighing 80 g/m$^2$, at an application rate of 12 g/m$^2$ to provide an ink jet recording paper.

EXAMPLE 1

A steam-heating system reaction vessel equipped with agitation blades and having a capacity of 55 m$^3$ was charged with 6.90 m$^3$ of sodium silicate ($SiO_2/Na_2O$ molar ratio= 3.08; $SiO_2$ content=28.32 weight %) containing 0.53 weight % (as $Al_2O_3$) of aluminum hydroxide, $Al(OH)_3$ based on the sum weight thereof with $SiO_2$ in the sodium silicate, and to which 8.18 m$^3$ of an aqueous sodium sulfate ($Na_2SO_4$) solution ($Na_2O$ content=2.30 weight %); and 25.32 m$^3$ of water were added. The first stage neutralization was conducted (neutralization ratio=48%) by adding 2.10 m$^3$ of 22% sulfuric acid, at the liquid temperature of 38° C. Then the liquid temperature was raised to 94° C. by blowing steam thereinto. Thereafter 2.18 m$^3$ of sulfuric acid was added to the liquid over 90 minutes, whereby the final pH of the reaction solution was adjusted to 3.2.

Subsequently the solution was filtered, washed with water and dried with a spray dryer. The dried product was ground with a single track jet mill under the conditions of: the sample feed rate=60 kg/H, feed pressure=6 kg/cm², and grinding pressure=2 kg/cm². Thus an amorphous silica powder as indicated in Table 1 was obtained.

Table 1 shows the results of measuring physical properties of the amorphous silica powder and image characteristics of the recording paper prepared therewith.

EXAMPLE 2

The dried product which was obtained in Example 1 was processed in the identical manner with Example 1 except that the grinding conditions were changed to: the sample feed rate=80 kg/H, feed pressure=5 kg/cm² and grinding pressure=1 kg/cm². The result of evaluating the resultant amorphous silica powder was as shown in Table 1.

EXAMPLE 3

Example 1 was repeated except that the amount of sulfuric acid added at the first stage was changed to 2.16 m³, the reaction temperature, to 92° C., the amount of subsequently added sulfuric acid, to 2.12 m³ and its addition time, to 70 minutes. The result of evaluating the resultant amorphous silica powder was as shown in Table 1.

EXAMPLE 4

Example 1 was repeated except that the amount of the aqueous sodium sulfate ($Na_2SO_4$) solution was changed to 8.39 m³, that of water, to 24.41 m³, and that of sulfuric acid added at the first stage, to 2.05 m³. The result of evaluating the resultant amorphous silica powder was as shown in Table 1.

EXAMPLE 5

A 8-liter capacity stainless steel reaction vessel equipped with agitation blades was charged with 3.23 liters of water and 1.02 liters of a sodium silicate solution ($SiO_2/Na_2O$ molar ratio=3.06; $SiO_2$ content=29.34 weight %) containing 0.38 weight % (as $Al_2O_3$) of $Al(OH)_3$ based on the sum weight thereof with $SiO_2$ in the sodium silicate, and to which 1.75 liters of an aqueous $Na_2SO_4$ solution ($Na_2O$ content= 1.61 weight %). The system was tentatively neutralized with sulfuric acid at 40° C. The neutralization ratio at this occasion was 50%. Thereafter the temperature of the system was raised to 95° C., and 0.345 liter of 22% sulfuric acid was added to the solution consuming 60 minutes. Thus adjusting the final pH to the system to 3.4, the reaction was terminated. The reaction product was filtered, washed with water and dried in an hot air. The dried product was coarsely ground in a coffee mill, and thereafter ground in a jet-O-Mizer under the conditions of: the sample feed rate=200 g/H, grinding pressure=3.5 kg/cm² and feed pressure, 4 kg/cm², to provide an amorphous silica powder.

Comparative Example 1

An amorphous silica powder was prepared by grinding the dry product obtained in Example 1 under grinding conditions different from those which were employed in Example 1. The result of evaluating the same as done as to the final product of Example 1 was as shown i n Table 1.

Comparative Example 2

An amorphous silica powder was prepared by repeating Example 3 except that the reaction temperature was changed to 84° C. The result was as shown in Table 1.

Comparative Example 3

An amorphous sill ca powder was prepared by repeating Example 1 except that grinding conditions different from those of Example 1 were employed. The result was as shown in Table 1.

Comparative Example 4

Tokusil U (a commercial product made by Tokuyama Corp.) serving as an amorphous silica was ground with Jet-O-mizer and its physical properties were measured. The result obtained through the use of this amorphous silica was as shown in Table 1.

Comparative Example 5

Tokusil P (a commercial product made by Tokuyama Corp.) serving as an amorphous silica was ground with Jet-O-mizer and its physical properties were measured. The result obtained through the use of this amorphous silica was as shown in Table 1.

Comparative Example 6

X-37 (a commercial product of Tokuyama Corp.) was used as the amorphous silica. The result was as shown in Table 1.

Comparative Example 7

To 4.25 liters of a sodium silicate solution ($SiO_2/Na_2O$ molar ratio=3.04; $SiO_2$ content=5.2 weight %) containing 0.98 weight % (as $Al_2O_3$) of $Al(OH)_3$ based on the sum weight thereof with $SiO_2$ in the sodium silicate, 1.85 liters of an aqueous $Na_2SO_4$ solution ($Na_2O$ content=1.61 weight %) was added. Then 0.79 liter of sulfuric acid was added at 40° C. to tentatively neutralize the system. Temperature of the system was subsequently raised to 93° C. After 30 minutes' stirring, 374 ml of sulfuric acid was added to the system consuming 90 minutes, to adjust the final pH of the system to 3.1. Treating the system similarly to Example 5 subsequently, an amorphous silica powder was obtained. The result of its similar evaluation was as shown in Table 1.

TABLE 1

| | Physical Properties of Fine Amorphous Silica Powder | | | | | | |
| --- | --- | --- | --- | --- | --- | --- | --- |
| | $Al_2O_3$ content (wt %) | specific surface area (m²/g) | peak position of pore radius (Å) | mean particle size (μm) | equal number n | oil absorption (ml/100 g) | viscosity of dispersion in pure water (cps) |
| Example 1 | 0.74 | 290 | 55 | 5.5 | 1.52 | 280 | 60 |
| Example 2 | 0.74 | 290 | 56 | 9.0 | 1.72 | 280 | 40 |
| Example 3 | 0.75 | 340 | 45 | 5.8 | 1.68 | 310 | 40 |
| Example 4 | 0.74 | 270 | 54 | 8.0 | 1.32 | 260 | 30 |

TABLE 1-continued

|  | | | | | | | |
|---|---|---|---|---|---|---|---|
| Example 5 | 0.55 | 280 | 50 | 6.0 | 1.62 | 290 | 50 |
| Comparative Example 1 | 0.73 | 290 | 55 | 2.5 | 2.06 | 260 | 200 |
| Comparative Example 2 | 0.74 | 360 | not detected | 4.4 | 1.78 | 320 | 500 |
| Comparative Example 3 | 0.74 | 290 | 55 | 13.0 | 1.52 | 270 | 120 |
| Comparative Example 4 | 0.63 | 210 | 140 | 6.4 | 1.74 | 270 | 340 |
| Comparative Example 5 | 0.68 | 200 | 120 | 4.9 | 1.84 | 240 | 400 |
| Comparative Example 6 | 0.72 | 260 | 62 | 2.7 | 2.48 | 260 | 180 |
| Comparative Example 7 | 1.31 | 350 | 82 | 2.4 | 1.36 | 300 | 220 |

| | Printed Image Characteristics | | | | |
|---|---|---|---|---|---|
| | ink absorbing property (s) | dot shape | optical density of printed letters | writing quality | surface strength (number of lots) |
| Example 1 | 30 | A | ◉ | ◉ | 3 |
| Example 2 | 28 | A | ◉ | ◉ | 3 |
| Example 3 | 31 | A | ◉ | ◉ | 1 |
| Example 4 | 29 | A | ◉ | ◉ | 5 |
| Example 5 | 29 | A | ◉ | ◉ | 3 |
| Comparative Example 1 | 33 | B | ◉ | ○ | 4 |
| Comparative Example 2 | 26 | C | ○ | ○ | 2 |
| Comparative Example 3 | 35 | C | Δ | ○ | 6 |
| Comparative Example 4 | 31 | C | Δ | ○ | 11 |
| Comparative Example 5 | 40 | C | Δ | ○ | 13 |
| Comparative Example 6 | 28 | A | ○ | ○ | 8 |
| Comparative Example 7 | 39 | B | Δ | ○ | 12 |

What is claimed is:

1. A filler for ink jet recording paper which is composed of an amorphous silica containing from 0.3 to 1.0% by weight of aluminum oxide ($Al_2O_3$) and having a BET specific surface area within a range of from 250 to 400 $m^2/g$, a mean particle size within a range of from 3.6 to 10.0 pm and the peak position of pore radius as measured by mercury injection method within a range of from 37.5 to 75 angstrom.

2. A filler for ink jet recording paper as described in claim 1, in which the amorphous silica contains from 0.5 to 0.8% by weight of $Al_2O_3$.

3. A filler for ink jet recording paper as described in claim 1, in which BET specific surface area of the amorphous silica is within a range of from 270 to 360 $m^2/g$.

4. A filler for ink jet recording paper as described in claim 1, in which the peak position of pore radius of the amorphous silica as measured by mercury injection method is within a range of from 40 to 65 angstrom.

5. A filler for ink jet recording paper as described in claim 1, in which the peak position of pore radius of the amorphous silica as measured by mercury injection method is within a range of from 42 to 56 angstrom.

6. A filler for ink jet recording paper as described in claim 1, of which dispersion in pure water has a viscosity not higher than 200 cps.

7. A filler for ink jet recording paper as described in claim 1, of which dispersion in pure water has a viscosity within a range of from 20 to 150 cps.

8. A filler for ink jet recording paper as described in claim 1, of which dispersion in pure water has a viscosity within a range of from 20 to 100 cps.

9. A filler for ink jet recording paper as described in claim 1, in which the amorphous silica has a mean particle size within a range of from 4.0 to 9.0 μm.

10. A filler for ink jet recording paper as described in claim 1, in which the amorphous silica has a mean particle size within a range of from 5.5 to 8.0 μm.

11. A filler for ink jet recording paper as described in claim 1, in which the equal number n of Rosin-Rammler's distribution as measured of the amorphous silica is within a range of from 0.8 to 2.5.

12. An ink jet recording paper having on at least one of its surfaces a coat layer composed of a mixture of a filler for ink jet recording paper as described in claim 1 with a water-soluble binder.

13. An ink jet recording paper as described in claim 12, in which the amount of the filler for ink jet recording paper in the coat layer is within a range of from 2 to 15 $g/m^2$.

* * * * *

UNITED STATES PATENT AND TRADEMARK OFFICE
CERTIFICATE OF CORRECTION

PATENT NO. : 5,720,806
DATED : February 24, 1998
INVENTOR(S) : Tsuneo FUJII et al.

It is certified that error appears in the above-indentified patent and that said Letters Patent is hereby corrected as shown below:

Claim 1, line 5, change "pm" to --$\mu$m--.

Signed and Sealed this

Eleventh Day of August 1998

Attest:

Attesting Officer

BRUCE LEHMAN

Commissioner of Patents and Trademarks